United States Patent
Biadsy et al.

(10) Patent No.: US 12,136,410 B2
(45) Date of Patent: Nov. 5, 2024

(54) SPEAKER EMBEDDINGS FOR IMPROVED AUTOMATIC SPEECH RECOGNITION

(71) Applicant: Google LLC, Mountain View, CA (US)

(72) Inventors: Fadi Biadsy, Mountain View, CA (US); Dirk Ryan Padfield, Seattle, WA (US); Victoria Zayats, Seattle, WA (US)

(73) Assignee: Google LLC, Mountain View, CA (US)

( * ) Notice: Subject to any disclaimer, the term of this patent is extended or adjusted under 35 U.S.C. 154(b) by 346 days.

(21) Appl. No.: 17/661,832

(22) Filed: May 3, 2022

(65) Prior Publication Data

US 2023/0360632 A1    Nov. 9, 2023

(51) Int. Cl.
*G10L 13/08* (2013.01)
*G10L 13/04* (2013.01)
*G10L 15/06* (2013.01)
*G10L 15/22* (2006.01)
*G10L 15/26* (2006.01)
*G10L 25/18* (2013.01)

(52) U.S. Cl.
CPC .............. *G10L 13/08* (2013.01); *G10L 13/04* (2013.01); *G10L 15/063* (2013.01); *G10L 15/22* (2013.01); *G10L 15/26* (2013.01); *G10L 25/18* (2013.01)

(58) Field of Classification Search
CPC ....... G10L 13/08; G10L 13/04; G10L 15/063; G10L 15/22; G10L 15/26; G10L 25/18; G10L 21/007; G10L 2021/0135
See application file for complete search history.

(56) References Cited

U.S. PATENT DOCUMENTS

| | | |
|---|---|---|
| 10,997,970 B1 | 5/2021 | Rafii |
| 2010/0217582 A1 | 8/2010 | Waibel et al. |
| 2016/0253994 A1* | 9/2016 | Panchapagesan ... G10L 21/0316 704/233 |

(Continued)

OTHER PUBLICATIONS

Fadi Biadsy et al: "A Scalable Model Specialization Framework for Training and Inference using Submodels and its Application to Speech Model Personalization", Arxiv.Org, Cornell University Library, 201 Olin Library Cornell University Ithaca, NY 14853, Mar. 23, 2022 (Mar. 23, 2022), Xp091183617 (Year: 2022).*

(Continued)

*Primary Examiner* — Michael N Opsasnick
(74) *Attorney, Agent, or Firm* — Honigman LLP; Brett A. Krueger; Grant Griffith

(57) ABSTRACT

A method includes receiving a reference audio signal corresponding to reference speech spoken by a target speaker with atypical speech, and generating, by a speaker embedding network configured to receive the reference audio signal as input, a speaker embedding for the target speaker. The speaker embedding conveys speaker characteristics of the target speaker. The method also includes receiving a speech conversion request that includes input audio data corresponding to an utterance spoken by the target speaker associated with the atypical speech. The method also includes biasing, using the speaker embedding generated for the target speaker by the speaker embedding network, a speech conversion model to convert the input audio data corresponding to the utterance spoken by the target speaker associated with atypical speech into an output canonical representation of the utterance spoken by the target speaker.

20 Claims, 6 Drawing Sheets

(56) References Cited

U.S. PATENT DOCUMENTS

| | | | |
|---|---|---|---|
| 2018/0336880 A1* | 11/2018 | Arik | G10L 25/30 |
| 2020/0034436 A1 | 1/2020 | Chen et al. | |
| 2020/0202869 A1* | 6/2020 | Wang | G10L 21/028 |
| 2020/0279561 A1* | 9/2020 | Sheeder | G06F 3/011 |
| 2021/0158812 A1 | 5/2021 | Wooters et al. | |
| 2021/0312914 A1 | 10/2021 | Hedayatnia et al. | |
| 2022/0093088 A1* | 3/2022 | Rangarajan Sridhar | G06F 16/338 |
| 2023/0154450 A1* | 5/2023 | Murai Von Bünau | A61F 2/20 704/259 |

OTHER PUBLICATIONS

"Cross-Attention End-To-End ASR for Two-Party Conversations", Kim et al. Jul. 24, 2019.

Fadi Biadsy et al, "A Scalable Model Specialization Framework for Training and Inference using Submodels and its Application to Speech Model Personalization", Arxiv.Org, Cornell University Library, 201 Olin Library Cornell University Ithaca, NY 14853, Mar. 23, 2022 (Mar. 23, 2022), XP091183617.

International Search Report and Written Opinion issued in related PCT Application No. PCT/US2023/020552, dated Jul. 7, 2023.

\* cited by examiner

SPEAKER EMBEDDINGS FOR IMPROVED AUTOMATIC SPEECH RECOGNITION

TECHNICAL FIELD

This disclosure relates to using speaker embeddings for improved automatic speech recognition.

BACKGROUND

Automatic speech recognition (ASR), the process of taking an audio input and transcribing it into text, has been an important technology that is used in mobile devices and other devices. In general, automatic speech recognition attempts to provide accurate transcriptions of what a person has said by taking an audio input (e.g., speech utterance) and transcribing the audio input into text.

One challenge in developing deep learning-based speech conversion models and ASR models is that parameters of these models tend to overfit the training data, thereby resulting in difficulties generalizing unseen data when the training data is not extensive enough. While training speech conversion models and ASR models on larger training datasets improves accuracy, there is a lack of sufficient training data including utterances targeting specific domains (i.e., linguistic diversity) that are spoken by speakers with atypical speech patterns (i.e., acoustic diversity) to achieve acceptable accuracy by these models.

SUMMARY

One aspect of the disclosure provides a computer-implemented method of using speaker embeddings for personalizing speech conversion models toward target speakers associated with atypical speech. The computer-implemented method when executed on data processing hardware causes the data processing hardware to perform operations that include receiving a reference audio signal corresponding to reference speech spoken by a target speaker with atypical speech, and generating, by a speaker embedding network configured to receive the reference audio signal as input, a speaker embedding for the target speaker. The speaker embedding conveys speaker characteristics of the target speaker. The operations also include receiving a speech conversion request that includes input audio data corresponding to an utterance spoken by the target speaker associated with the atypical speech. The operations also include biasing, using the speaker embedding generated for the target speaker by the speaker embedding network, a speech conversion model to convert the input audio data corresponding to the utterance spoken by the target speaker associated with atypical speech into an output canonical representation of the utterance spoken by the target speaker.

Implementations of the disclosure may include one or more of the following optional features. In some implementations, the speech conversion model includes a speech-to-speech conversion model configured to convert input spectrograms or audio waveforms directly into output spectrograms or audio waveforms. In these implementations, biasing the speech conversion model includes biasing, using the speaker embedding, the speech-to-speech conversion model to convert the input audio data corresponding to the utterance spoken by the target speaker associated with atypical speech into output audio data corresponding to a synthesized canonical fluent speech representation of the utterance spoken by the target speaker. Here, the output canonical representation includes the synthesized canonical fluent speech representation.

In some examples, the speech conversion model includes an automated speech recognition model configured to convert speech into text. In these examples, biasing the speech conversion model includes biasing, using the speaker embedding, the automated speech recognition model to convert the input audio data corresponding to the utterance spoken by the target speaker associated with atypical speech into a canonical textual representation of the utterance spoken by the target speaker. Here, the output canonical representation includes the canonical textual representation.

In some implementations, the operations also include determining, using the speaker embedding network, a personalization embedding for the target speaker based on the speaker embedding, wherein the personalization embedding corresponds to a respective style cluster of speaker embeddings extracted from training utterances spoken by training speaker that convey speaker characteristics similar to the speaker characteristics conveyed by the speaker embedding. Here, biasing the speech conversion model includes using the personalization embedding determined for the target speaker to bias the speech conversion model for a type of the atypical speech associated with the target speaker. In these implementations, using the personalization embedding determined for the target speaker to bias the speech conversion model may include providing the personalization embedding as a side input to the speech conversion model for biasing the speech conversion model for the type of the atypical speech associated with the target speaker. Optionally, using the personalization embedding determined for the target speaker to bias the speech conversion model may include providing the personalization embedding as a side input to a sub-model that biases the speech conversion model for the type of the atypical speech associated with the target speaker. The operations may also include, prior to biasing the speech conversion model, selecting, using the personalization embedding determined for the target speaker, the sub-model from a plurality of different sub-models. Here, each sub-model of the plurality of different sub-models may be trained for a different type or severity of atypical speech.

In some examples, a training process trains the speech conversion model end-to-end concurrently with the speaker embedding network by obtaining multiple sets of spoken training utterances and training the speech conversion model and the speaker embedding model concurrently on the multiple sets of spoken training utterances. Each set of the spoken training utterances is spoken by a different respective training speaker and includes audio data characterizing the training utterances that include atypical speech patterns for a type of atypical speech associated with the respective training speaker, and a canonical transcription of the training utterances spoken by the respective training speaker.

The speaker embedding network may include reference encoder and a style attention module, wherein the reference encoder is configured to extract, from each set of the spoken training utterances, a respective speaker embedding for the respective training speaker. Training the speech conversion model and the speaker embedding network may include training the style attention module to learn how to group the speaker embeddings into style clusters, wherein each style cluster may denote a respective cluster of speaker embeddings extracted from the training utterances spoken by training speakers with similar speaker characteristics, and may map to a respective personalization embedding that represents a respective type of atypical speech. For each corresponding set of the multiple sets of spoken training utterances, training the speech conversion model includes biasing the speech conversion model for the corresponding set of the spoken training utterances using the respective personalization embedding that maps to the style cluster that includes the respective speaker embedding extracted from the corresponding set of the spoken training utterances.

In some implementations, training the speech conversion model and the speaker embedding model concurrently further includes training a sub-model on the multiple sets of the training utterances to learn how to bias the speech conversion model. Here parameters of the speech conversion model are frozen while training the speech embedding network and the sub-model on the multiple sets of the training utterances. In some examples, one or more sets among the multiple sets of training utterances each include atypical speech patterns for a respective type of atypical speech associated with the different respective training speaker that is different than the respective types of atypical speech associated with each other different respective training speaker.

Another aspect of the disclosure provides a system for training a speech conversion model and a speaker personalization network for a target speaker associated with atypical speech. The system includes data processing hardware and memory hardware in communication with the data processing hardware. The memory hardware stores instructions that when executed on the data processing hardware cause the data processing hardware to perform operations. The operations include receiving a reference audio signal corresponding to reference speech spoken by a target speaker with atypical speech, and generating, by a speaker embedding network configured to receive the reference audio signal as input, a speaker embedding for the target speaker. The speaker embedding conveys speaker characteristics of the target speaker. The operations also include receiving a speech conversion request that includes input audio data corresponding to an utterance spoken by the target speaker associated with the atypical speech. The operations also include biasing, using the speaker embedding generated for the target speaker by the speaker embedding network, a speech conversion model to convert the input audio data corresponding to the utterance spoken by the target speaker associated with atypical speech into an output canonical representation of the utterance spoken by the target speaker.

Implementations of the disclosure may include one or more of the following optional features. In some implementations, the speech conversion model includes a speech-to-speech conversion model configured to convert input spectrograms or audio waveforms directly into output spectrograms or audio waveforms. In these implementations, biasing the speech conversion model includes biasing, using the speaker embedding, the speech-to-speech conversion model to convert the input audio data corresponding to the utterance spoken by the target speaker associated with atypical speech into output audio data corresponding to a synthesized canonical fluent speech representation of the utterance spoken by the target speaker. Here, the output canonical representation includes the synthesized canonical fluent speech representation.

In some examples, the speech conversion model includes an automated speech recognition model configured to convert speech into text. In these examples, biasing the speech conversion model includes biasing, using the speaker embedding, the automated speech recognition model to convert the input audio data corresponding to the utterance spoken by the target speaker associated with atypical speech into a canonical textual representation of the utterance spoken by the target speaker. Here, the output canonical representation includes the canonical textual representation.

In some implementations, the operations also include determining, using the speaker embedding network, a personalization embedding for the target speaker based on the speaker embedding, wherein the personalization embedding corresponds to a respective style cluster of speaker embeddings extracted from training utterances spoken by training speaker that convey speaker characteristics similar to the speaker characteristics conveyed by the speaker embedding. Here, biasing the speech conversion model includes using the personalization embedding determined for the target speaker to bias the speech conversion model for a type of the atypical speech associated with the target speaker. In these implementations, using the personalization embedding determined for the target speaker to bias the speech conversion model may include providing the personalization embedding as a side input to the speech conversion model for biasing the speech conversion model for the type of the atypical speech associated with the target speaker. Optionally, using the personalization embedding determined for the target speaker to bias the speech conversion model may include providing the personalization embedding as a side input to a sub-model that biases the speech conversion model for the type of the atypical speech associated with the target speaker. The operations may also include, prior to biasing the speech conversion model, selecting, using the personalization embedding determined for the target speaker, the sub-model from a plurality of different sub-models. Here, each sub-model of the plurality of different sub-models may be trained for a different type or severity of atypical speech.

In some examples, a training process trains the speech conversion model end-to-end concurrently with the speaker embedding network by obtaining multiple sets of spoken training utterances and training the speech conversion model and the speaker embedding model concurrently on the multiple sets of spoken training utterances. Each set of the spoken training utterances is spoken by a different respective training speaker and includes audio data characterizing the training utterances that include atypical speech patterns for a type of atypical speech associated with the respective training speaker, and a canonical transcription of the training utterances spoken by the respective training speaker.

The speaker embedding network may include reference encoder and a style attention module, wherein the reference encoder is configured to extract, from each set of the spoken training utterances, a respective speaker embedding for the respective training speaker. Training the speech conversion model and the speaker embedding network may include training the style attention module to learn how to group the speaker embeddings into style clusters, wherein each style cluster may denote a respective cluster of speaker embeddings extracted from the training utterances spoken by training speakers with similar speaker characteristics, and may map to a respective personalization embedding that represents a respective type of atypical speech. For each corresponding set of the multiple sets of spoken training utterances, training the speech conversion model includes biasing the speech conversion model for the corresponding set of the spoken training utterances using the respective personalization embedding that maps to the style cluster that includes the respective speaker embedding extracted from the corresponding set of the spoken training utterances.

In some implementations, training the speech conversion model and the speaker embedding model concurrently further includes training a sub-model on the multiple sets of the training utterances to learn how to bias the speech conversion model. Here parameters of the speech conversion model are frozen while training the speech embedding network and the sub-model on the multiple sets of the training utterances. In some examples, one or more sets among the multiple sets of training utterances each include atypical speech patterns for a respective type of atypical speech associated with the different respective training speaker that is different than the respective types of atypical speech associated with each other different respective training speaker.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
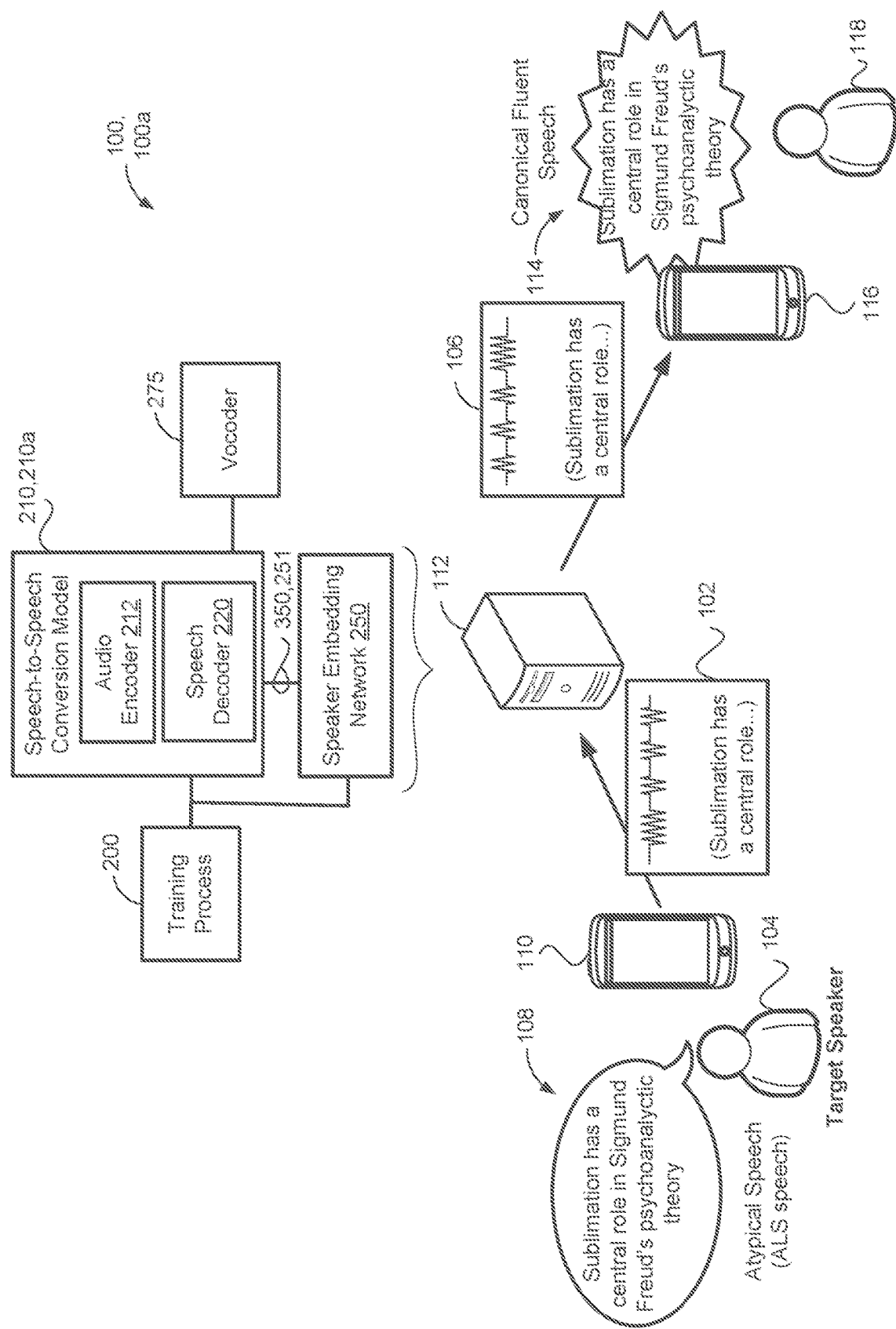
FIG. 1A is a schematic view of an example speech conversion system including a speech-to-speech conversion model.

Automated speech recognition (ASR) systems are often optimized to work best for speakers with canonical speech patterns. Unfortunately, these systems can perform poorly when tested on speakers associated with atypical speech and heavily accented speech. The poor performance on these speakers is because a vast majority of the speech data used to train these ASR systems is derived from speakers who speak a canonical accent with typical speech patterns, which causes the ASR systems to bias towards this accent resulting in poorer performance for other accents.

ASR systems made tremendous strides with the introduction of end-to-end (E2E) deep learning-based models to recognize speech from speakers with atypical speech patterns for conversion into accurate transcriptions. For instance, atypical speech patterns may include, without limitation, impaired speech due to physical or neurological conditions (e.g., speakers with Amyotrophic Lateral Sclerosis (ALS) disease), heavily-accented speech, and deaf speech. Similar deep learning-based models can be applied by speech-to-speech conversion systems to convert speech with atypical speech patterns into canonical fluent output speech. As used herein, and unless specified otherwise, the terms "speech conversion system" and "speech conversion model" can refer to either an ASR system/model, in which input atypical speech is recognized and converted into corresponding text (e.g., transcription), or a speech-to-speech conversion system/model, in which the input atypical speech is directly converted into canonical fluent synthesized speech without performing speech recognition. Stated differently, the speech-to-speech conversion system/model is configured to convert an input audio waveform or spectrograms corresponding to the atypical speech directly into an output audio waveform or spectrograms corresponding to the canonical fluent speech without converting the input audio waveform into an intermediate representation (e.g., text or phonemes). As will become apparent, speech conversion models, as well as techniques for training speech conversion models, will enable a user with atypical speech to speak to, and be understood by, both other humans and speech interfaces (e.g., digital assistants) by enabling recognition and/or reproduction of the user's intended speech.

One challenge in developing deep learning-based speech conversion models and ASR models is that parameters of these models tend to overfit the training data, thereby resulting in difficulties generalizing unseen data when the training data is not extensive enough. While training speech conversion models and ASR models on larger training datasets improves accuracy, there is a lack of training data that provides acoustic diversity sufficient for personalization toward a target speaker having atypical speech. For instance, to attain training data with sufficient acoustic diversity, the target speaker having the atypical speech would have to record hours of spoken utterances each paired with a corresponding transcription.

One approach to recognizing speech from speakers exhibiting atypical speech or heavily-accented speech is to create personalized speech conversion models, one per speaker, that have the potential of dramatically improving speech recognition for an individual speaker. While per speaker personalized speech conversion models are generally effective, the drawback to this approach is scalability due to a requirement to train and maintain a separate model for each speaker. Another drawback to per speaker personalized speech conversion models is that they typically need to run on specialized computing resources, e.g., Tensor Processing Units (TPUs), Graphical Processing Units (GPUs), etc., which are not readily available when served on a server or only available on high-end user computing devices (e.g., smart phones).

Figure 1B:
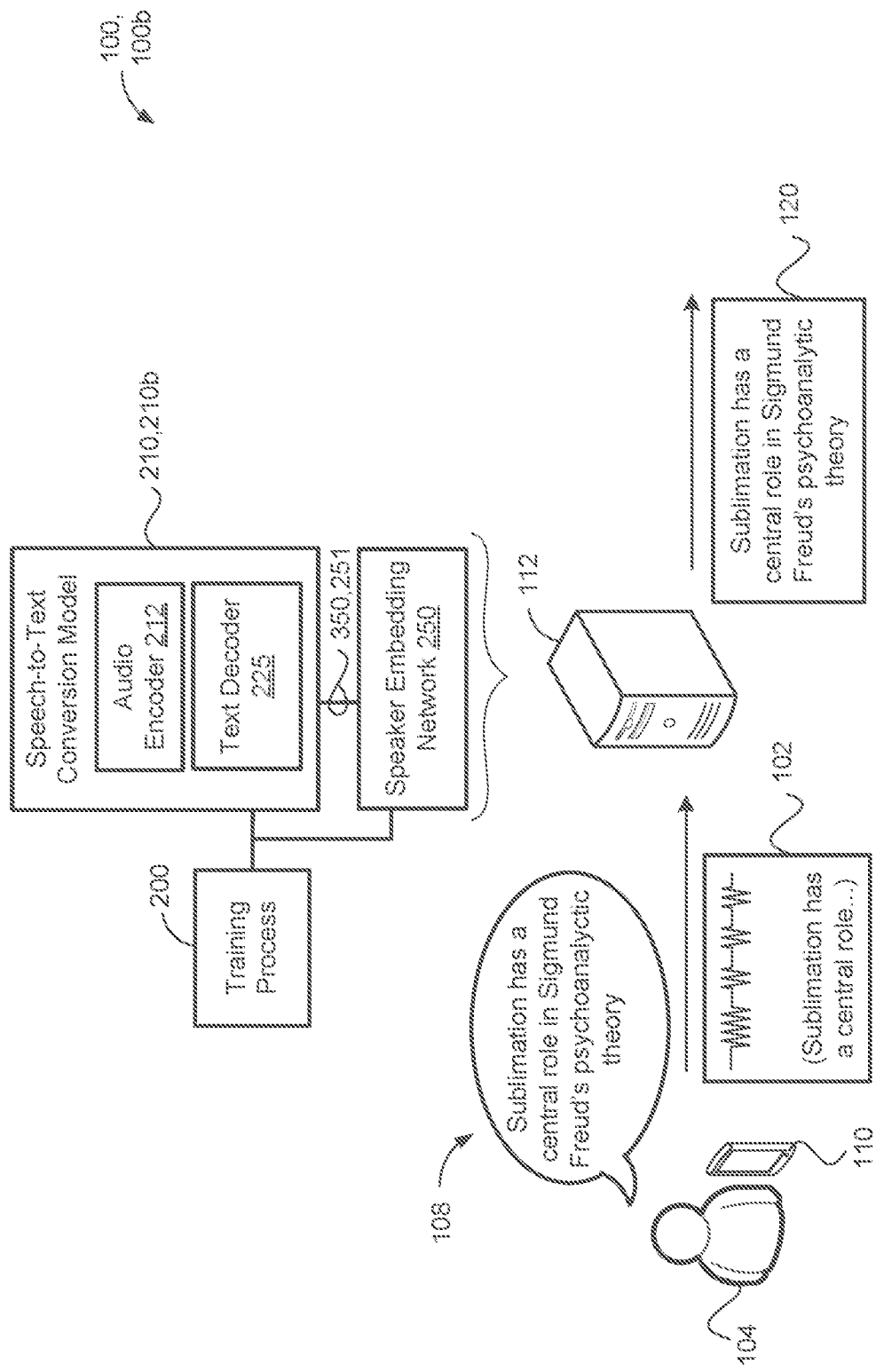
FIG. 1B is a schematic view of an example speech conversion system including a speech-to-text conversion model.

Implementations herein are directed toward building a speech conversion system that adapts to atypical speaking patterns to perform equally well on recognizing/converting speech from people who speak with different accents, locals, dialects or different ways of speaking. Specifically, implementations are directed toward training a speaker embedding network and a speech conversion model concurrently to provide a personalizable speech conversion system that shares training data across speakers with similar acoustic-phonetic properties and that enables implicit clustering of speaker embeddings FIGS. 1A and 1B illustrate a speech conversion system 100, 100a-b that includes a speech conversion model 210 and a speaker embedding network 250. FIG. 1A shows a speech-to-speech (S2S) conversion model 210, 210a configured to convert input audio data 102 (e.g., input spectrogram or input audio waveform) corresponding to an utterance 108 spoken by a target speaker 104 associated with atypical speech directly into output audio data 106 (e.g., output spectrogram or output audio waveform) corresponding to a synthesized canonical fluent speech representation of the same utterance 114 spoken by the target speaker 104. Notably, the S2S conversion model 210a is configured to convert the input audio data 102 directly into the output audio data 106 without performing speech recognition, or otherwise without requiring the generation of any intermediate discrete representations (e.g., text or phonemes) from the input audio data 102. The S2S conversion model 210a includes an audio encoder 212 configured to encode the input audio data 102 into a hidden feature representation (e.g., a series of vectors) and a speech decoder 220 configured to decode the hidden representation into the output audio data 106 corresponding to the synthesized canonical fluent speech representation. For instance, as the audio encoder 210 receives the input audio data 102 of the utterance 108, the audio encoder 210 may process five frames of audio and convert those five frames of audio to ten vectors. The vectors are not a transcription of the frames of audio data 102, but rather a mathematical representation of the frames of the audio data 102. In turn, the speech decoder 220 may generate the output audio data 106 corresponding to the synthesized canonical fluent speech representation based on the vectors received from the audio encoder 210. For example, the speech decoder 220 may receive the ten vectors from the audio encoder 210 that represent the five frames of audio. Here, the speech decoder 220 may generate five frames of output audio data 106 corresponding to the synthesized canonical fluent speech representation of the utterance 114 that includes the intended words or parts of words as the five frames of the input audio data 102, but without the disfluencies of the atypical speech.

The S2S conversion system 100a may further include a synthesizer 275 to synthesize the output audio data 106 into a time-domain waveform for audible output as a same utterance 114 of fluent canonical fluent speech. A time-domain audio waveform includes an audio waveform that defines an amplitude of an audio signal over time. The synthesizer 275 may include a unit selection module or a WaveNet module for synthesizing the output audio data 106 into time-domain waveforms of synthesized canonical fluent speech. In some implementations, the synthesizer 275 includes a vocoder network, i.e., neural vocoder, that is separately trained and conditioned on mel-frequency spectrograms for conversion into time-domain audio waveforms.

In the example shown, the target speaker 104 is associated with atypical speech such that the target speaker 104 speaks with an atypical speech pattern that may be difficult to understand. Atypical speech patterns may include, without limitation, impaired speech due to physical or neurological conditions (e.g., speakers with Amyotrophic Lateral Sclerosis (ALS) disease), heavily-accented speech, and deaf speech. The speaker embedding network 250 generates a speaker embedding 350 representing a voice of the target speaker 104 as well as speaker characteristics of the target speaker 104. The speaker characteristics may convey an accent (e.g., French accent) and a speech pattern associated with the target speaker 104. Here, the speech pattern conveyed by the speaker embedding 350 may include a typical speech pattern or one of a variety of different types of atypical speech patterns (e.g., heavy accents spanning different dialects and/or irregular speech spanning different neurological conditions). Notably, and as described in greater detail below with reference to FIG. 2, the speaker embedding network 250 may be trained concurrently with the S2S conversion model 210a or with and/or with sub-model 280 (FIG. 2) tasked with influencing the S2S conversion model 210a toward the target speaker 104 during inference. By training the speaker embedding network 250 and the S2S conversion model 210 or sub-model 280 concurrently, the speaker embedding network 250 is able to generate speaker embeddings 350 that are more optimal for assisting the S2S conversion model 210a to convert atypical speech patterns into canonical speech. By contrast, a separately trained speaker embedding model, such as one implemented for generating speaker-discriminative embeddings used for voice authentication/verification, is typically trained to recognize a voice of a speaker and to ignore any accents/speaker characteristics.

In some implementations, the S2S conversion model 210a receives the speaker embedding 350 generated by the speaker embedding network 250 as a side input for biasing/influencing the S2S conversion model 210a in converting the input audio data 102 corresponding to utterances 108 spoken by the target speaker 104 associated with atypical speech directly into the output audio data 106 corresponding to the synthesized canonical fluent speech representation of the same utterance 108. In other implementations, the speaker embedding network 250 further generates a personalization embedding 251 based on the speaker embedding 350 and provides the personalization embedding 251 as a side input to the sub-model 280 or the S2S conversion model 210a for biasing/influencing the S2S conversion model 210a in converting utterances 108 of atypical speech directly into synthesized canonical fluent speech representations of the same utterances 108. As described in greater detail below with reference to FIG. 2, the personalization embedding 251 may denote a respective cluster of speaker embeddings 350 extracted from training utterances 305 (FIG. 2) spoken by speakers with similar speaker characteristics (i.e., accent and speech pattern) as the target speaker 104. As such, the personalization embedding 251 may correspond to a context vector for parameterizing/personalizing the sub-model 280 and/or the S2S conversion model 210a to improve speech conversion performance on the type of atypical speech associated with the target speaker 104. For instance, the personalization embedding 251 may indicate the type of atypical speech (e.g., ALS speech) associated with the target speaker 104, or may even provide more fine-grained information such as a severity level of the type of atypical speech.

The speech-to-speech conversion system 100a is accordingly trained to convert the input audio data 102 corresponding to utterances 108 spoken by the target speaker 104 associated with atypical speech directly into the output audio data 106 corresponding to the synthesized canonical fluent speech representation of the same utterance 108. Thus, the synthesized canonical fluent speech representation provided by the output audio data 106 improves intelligibility of the atypical speech (e.g., heavily-accented speech or ALS speech) spoken by the target speaker 104. Without departing from the scope of the present disclosure, the speech-to-speech conversion system 100a may be trained to convert input audio data 102 corresponding to utterances 108 associated with atypical speech in a first language directly into output audio data 106 corresponding to a synthesized canonical fluent speech representation of the same utterance 108 in the same voice, but in a different second language.

A computing device 110 associated with the target speaker 104 may capture the utterance 108 spoken by the target speaker 104 and transmit the corresponding input audio data 102 to the speech-to-speech conversion system 100a for conversion into the output audio data 106. Thereafter, the speech-to-speech conversion system 100a may transmit the output audio data 106 corresponding to the synthesized canonical fluent speech representation of the same utterance 114 spoken by the target speaker 104 to another computing device 116 associated with user 118, whereby the other computing device 116 audibly outputs the synthesized canonical fluent speech representation of the utterance 108 spoken by the target speaker 104. In this example, the target speaker 104 and the user 118 are speaking with each other through their respective computing devices 110, 116, such as over a telephone call or other type of voice communication protocol, for example, voice over internet protocol. While the target speaker 104 and the other user 118 may speak the same language, it may be difficult for the other user 118 to understand the target speaker 104 because the target speaker 104 has atypical speech due to ALS disease. Thus, while the target speaker 104 speaks with atypical speech (e.g., ALS speech) that may be difficult to understand, the other user 118 hearing the synthesized canonical fluent speech representation will have an easier time understanding the utterance 108 intended by the target speaker 104. Stated differently, the synthesized canonical fluent speech representation provides a more consistent cadence that may be easier for another user to understand than the original utterance 108 spoken by the target speaker with the atypical speech. Notably, the synthesized canonical fluent speech representation is in the voice of the target speaker 104.

In some other examples, the S2S conversion system 100a instead passes the output audio data 106 corresponding to the synthesized canonical fluent speech representation of the utterance spoken by the target speaker 104 to an output audio device for audibly outputting the synthesized canonical fluent speech representation in the voice of the target speaker 104 to an audience. For instance, the target speaker 104 may be a psychology professor providing a lecture to a class of students, in which utterances spoken by the target speaker 104 include medical terminology belonging to a particular specific domain, e.g., psychology. As will become apparent, the S2S conversion system 100a is trained to learn linguistic diversity from linguistic content present in training utterances as well acoustic diversity associated with particular types of atypical speech associated with speakers that spoke the target utterances.

Alternatively, the other computing device 116 may be associated with down-stream automated speech recognition (ASR) system in which the speech-to-speech conversion system 100a functions as a front-end to provide the output audio data 106 corresponding to the synthesized canonical fluent speech representation as an input to the ASR system for conversion into recognized text. The recognized text could be presented to the other user 118 and/or could be provided to a natural language understanding (NLU) system for further processing. The functionality of the speech-to-speech conversion system 100a can reside on a remote server 112, on either or both of the computing devices 110, 116, or any combination of the remote server and computing devices 110, 116. In some implementations, the S2S conversion model 210a continuously generates output audio data 106 corresponding to synthesized canonical fluent speech representations of an utterance as the target speaker 104 speaks corresponding portions of the utterance as atypical speech. By continuously generating output audio data 106 corresponding to synthesized canonical fluent speech representations of portions of the utterance 108 spoken by the target speaker 104, the conversation between the target speaker 104 and the user 118 (or audience) may be more naturally paced. In some additional implementations, the S2S conversion model 210a waits to determine/detect when the target speaker 104 stops speaking, using techniques such as voice activity detection, end pointing, end of query detection, etc., and before converting the corresponding input audio data 102 of the utterance 108 with atypical speech into the corresponding output audio data 106 corresponding to synthesized canonical fluent speech representation of the same utterance 114.

Referring now to FIG. 1B, in some implementations, the speech conversion system 100, 100b includes a speech-to-text conversion system 100b configured to convert the input audio data 102 corresponding to the utterance 108 spoken by the target speaker 104 associated with the atypical speech into a canonical textual representation (i.e., a transcription) 120 of the utterance 108. Accordingly, the speech-to-text conversion system 100b may correspond to a personalized automated speech recognition (ASR) system for the target speaker 104 that can recognize the target speaker's particular type of atypical speech patterns, as well as linguistic information, for conversion into a corresponding canonical textual representation 120 that captures the intent of the original utterance 108 spoken by the target speaker 104 associated with the atypical speech. Another user 118 (FIG. 1A) may obtain the canonical textual representation 120 of the utterance 108. In some configurations, the canonical textual representation 120 output from the system 100b is processed, e.g., by a natural language understanding (NLU) module executing on the user device 110 or the remote server 112, to execute a user command. Additionally or alternatively, a text-to-speech system (e.g., executing on any combination of the user device 110 or the remote server 112) may convert the transcription into synthesized speech for audible output by another device. The functionality of the speech-to-text conversion system 100b can reside on the remote server 112, on either or both of the computing device 110, or any combination of the remote server 112 and computing device 110.

A speech conversion model 210 associated speech-to-text conversion system 100b may include a speech-to-text conversion model 210b (interchangeably referred to as an automated speech recognition (ASR) model 210b) configured to perform speech recognition on the utterance 108 of atypical speech by converting the input audio data 102 into the canonical textual representation (i.e., transcription) 120 of the utterance 108. The ASR model 210b includes the same or a different audio encoder 210 that is configured to encode the input audio data 102 into a hidden feature representation (e.g., a series of vectors) and a text decoder 225 configured to decode the hidden representation into the canonical transcription 120. For instance, as the audio encoder 212 receives the input audio data 102 of the utterance 108, the encoder 212 may process five frames of audio and convert those five frames of audio to ten vectors. The vectors are not a transcription of the frames of audio data 102, but rather a mathematical representation of the frames of the audio data 102. In turn, the text decoder 225 may generate the canonical transcription 120 based on the vectors received from the encoder 212. For example, the text decoder 225 may generate a sequence of words corresponding to the canonical transcription 120 of the utterance 180 that includes the intended words or parts of words in the five frames of the input audio data 102. Without departing from the scope of the present disclosure, the speech-to-text conversion system 100b may be trained to convert input audio data 102 corresponding to utterances 108 associated with atypical speech in a first language into a corresponding canonical transcription of the utterance 108 a different second language.

Figure 2:
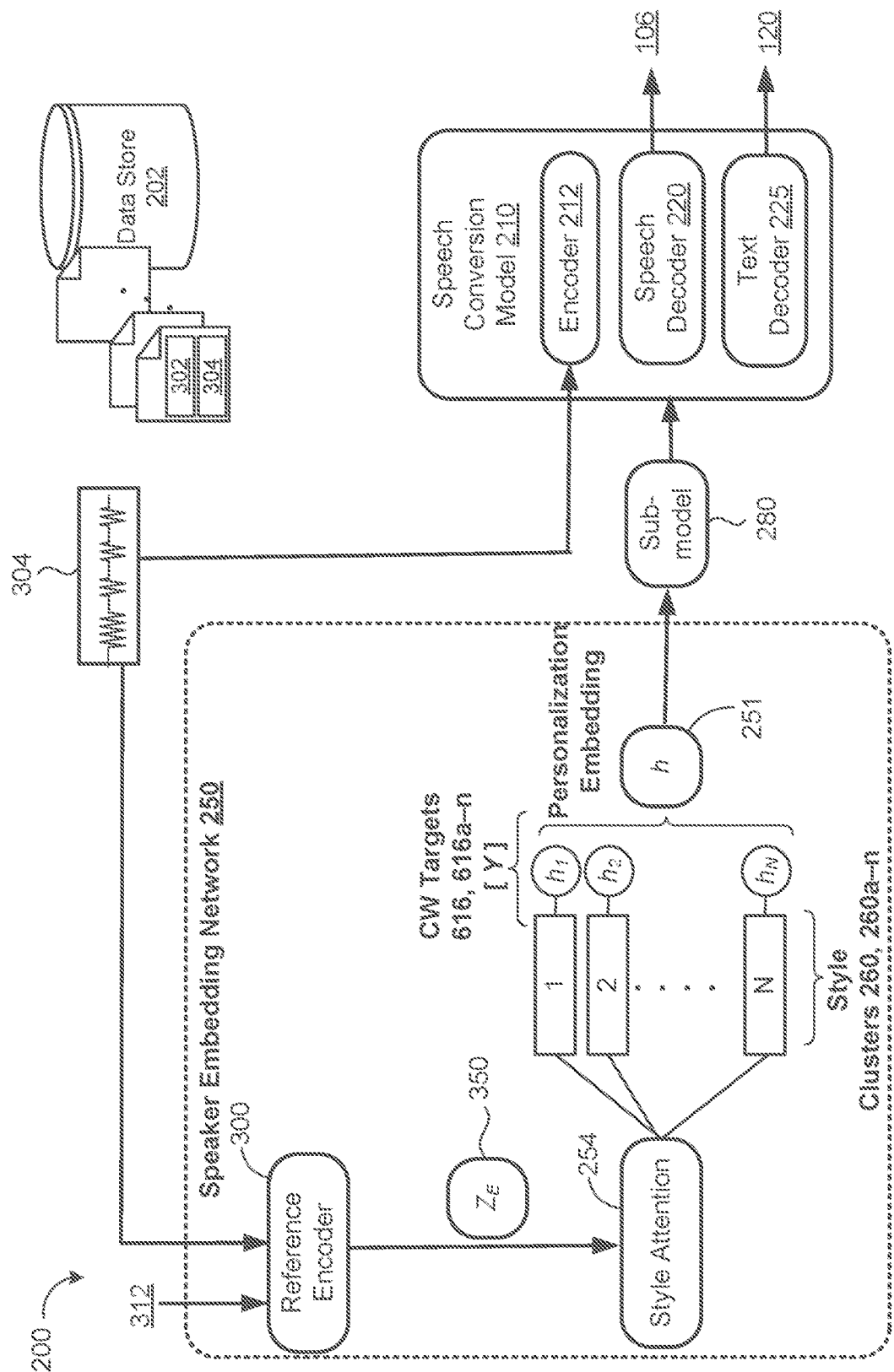
FIG. 2 is a schematic view of an example training process for training a speaker embedding network and an end-to-end speech conversion model concurrently.

Referring to FIGS. 1A, 1B, and 2, the speech conversion system 100 executes a training process 200 configured to train the speech conversion model 210, i.e., the S2S conversion model 210a of FIG. 1A and/or the speech-to-text conversion model 210b of FIG. 1B, end-to-end concurrently with the speaker embedding network 250 to improve performance of the speech conversion system 100 in recognizing and/or converting different types of atypical speech typically underrepresented in general training data.

FIG. 2 shows the training process 200 obtaining multiple sets of spoken training utterances 305, 305a-n each including audio data 304 characterizing the training utterances 305 spoken by a respective training speaker. The sets of spoken training utterances 305 may be stored in a data store 202 residing on memory hardware 520 (FIG. 5) of the user device 110 or the remote server 112. Here, the training utterances 305 in each set spoken by the respective training speaker include a corresponding transcription 302 paired with the audio data 304 characterizing the training utterances. As such, the spoken training utterances 305 in each set include manually-transcribed audio data 302, 304 spoken by the respective training speaker. The audio data 304 corresponds to a speech representation of the corresponding training utterances 305 that is in a voice of, and conveys the speaker characteristics (e.g., accent and/or speech pattern) of, the respective training speaker that spoke the training utterances 305 in each set of spoken training utterances 305. While examples include the audio data 304 corresponding to non-synthetic speech representations (e.g., human-derived speech), some of the training utterances 305 may include audio data 304 corresponding to synthetic/synthesized speech representations targeting a particular voice and speaking patterns.

Implementations herein are directed toward the multiple sets of the spoken training utterances 305 each including atypical speech patterns for a type of atypical speech associated with the respective training speaker that spoke the training utterances 305. For instance, one or more of the sets of spoken training utterances 305 may be spoken by training speakers that exhibit atypical speech patterns for ALS speech, one or more other sets of the spoken training utterances 305 may be spoken by training speakers that exhibit atypical speech patterns for dysarthria, one or more other sets of the spoken training utterances 305 may be spoken by training speakers that exhibit atypical speech patterns for heavily-accented speech in a given dialect (e.g., French accent), and so on. Each transcription 302 may be a canonical transcription in the native speaking language of the target speaker 104. In some examples, some or all of the spoken training utterances 305 include words and/or phrases pertaining to a specific domain in which the speech conversion model 210 is trained to learn.

The speech embedding network 250 includes a reference encoder 300 and a style attention module 254. During the training process 200, the reference encoder 300 receives, as input, the audio data 304 characterizing the training utterances 305 spoken by the respective training speaker associated with each set of training utterances 305, and generates, as output, a respective speaker embedding ($Z_E$) 350 for the respective training speaker. Here, the speaker embedding 350 output from the reference encoder 300 represents a voice of the respective training speaker as well as speaker characteristics of the respective training speaker. As described previously, the speaker characteristics may convey an accent (e.g., French accent) and a speech pattern associated with the training speaker. Here, the speech pattern conveyed by the speaker embedding 350 may include a typical speech pattern or one of a variety of different types of atypical speech patterns (e.g., heavy accents spanning different dialects, irregular speech spanning different neurological conditions).

Figure 3:
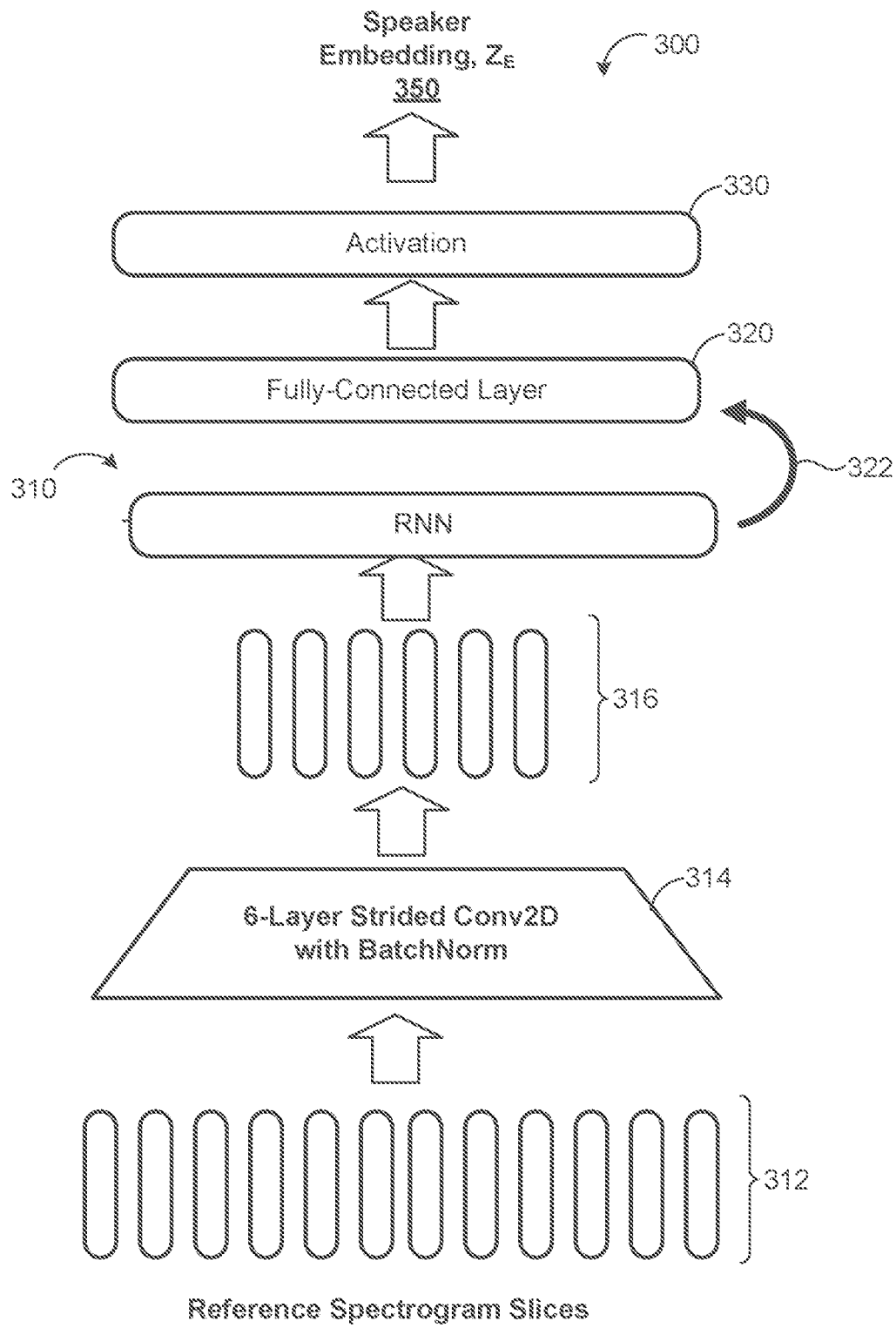
FIG. 3 is a schematic view of an example deterministic reference encoder for extracting a speaker embedding.

Referring to FIG. 3, in some implementations, an example reference encoder is configured to receive a reference audio signal 312 (e.g., training audio data 304 or input audio data 102 corresponding to reference speech spoken by the target speaker 104) and generate/predict the speaker embedding $Z_E$ 350 from the reference audio signal 312. The reference audio signal 312 may be of a duration sufficient to capture various acoustic-phonetic features associated with the speaker. In some examples, the reference audio signal 312 includes a duration of about one (1) minute. The speaker embedding $Z_E$ 350 may capture speaker characteristics of the reference audio signal 312 that convey an accent and a speech pattern associated with the reference audio signal 312.

In the example shown, the reference audio signal 312 may be represented as spectrogram slices having a length $L_R$ and dimension $D_R$. The spectrogram slices associated with the reference audio signal 312 may be indicative of a Mel-warped spectrum. In some examples, the reference encoder 300 includes a six-layer convolutional layer network 314 with each layer including 3×3 filters with 2×2 stride, SAME padding, and ReLU activation. Batch normalization is applied to every layer and the number of filters in each layer doubles at half the rate of downsampling: 32, 32, 64, 128, 128. A recurrent neural network (RNN) 310 having bi-directional long short-term memory (LSTM) layers receives the output 316 from the last convolutional layer to provide an output 322 applied to a fully connected layer 320 followed by an activation function 330 that outputs the speaker embedding $Z_E$ 350. In lieu of the RNN, the reference encoder 300 may incorporate a single 128-width Gated Recurrent Unit (GRU-RNN) layer receives the output 316 from the last convolutional layer and outputs a 128-dimensional output 322 applied to the fully connected layer 320.

Referring back to the training process 200 of FIG. 2, the style attention module 254 receives the speaker embeddings 350 output from the reference encoder 300 and uses the speaker embeddings 350 as query vectors to learn similarity between the speaker embeddings 350. More specifically, the training process 200 trains the style attention module 254 to learn how to group the speaker embeddings 350 into style clusters 260, 260a-n each denoting a respective cluster of speaker embeddings 350 extracted from the training utterances 305 spoken by training speakers with similar characteristics (i.e., accent and speech pattern). For instance, the first style cluster 260a may include speaker embeddings 350 extracted from training utterances 305 spoken by training speakers associated with ALS speech and the second style cluster 260a may include speaker embeddings 350 extracted from training utterances 305 spoken by training speakers associated with down syndrome speech.

Moreover, each style cluster 260 that the style attention module 254 learns to group similar speaker embeddings 350 into need not represent a respective type of atypical speech that is different that the type of atypical speech represented by the other style clusters. That is, one style cluster 260 may include a grouping of similar speaker embeddings 350 extracted from training utterances 305 spoken by training speakers associated with a first severity level of a type of atypical speech while another style cluster 260 may include another cluster of speaker embeddings 350 extracted from training utterances 305 spoken by other training speakers associated with a second severity level of the same type of atypical speech. As such, the style attention module 254 learns how to group similar speaker embeddings 350 into clusters 260 that represent different types (and/or severity levels) of atypical speech (e.g., heavy accents spanning different dialects and/or irregular speech spanning different neurological conditions). The attention module 254 may be viewed as a mechanism configured to map a new speaker embedding 350 to a respective style cluster 260 having speaker embeddings conveying similar speaker characteristics.

During the training process 200, the style attention module 254 may learn to generate a personalization embedding (h) 251 for each respective speaker embedding 350 based on the corresponding style cluster 260 the respective speaker embedding 250 is grouped into. In some configurations, the style attention module 254 receives the speaker embedding 350 extracted from the set of training utterances 305 spoken by a respective speaker and outputs a set of combination weights that represent the contribution of each style cluster 260 to the corresponding speaker embedding 350. In these configurations, the weighted sum of style clusters 260 corresponds to the personalization embedding 251 that is input to the sub-model 280 and/or speech conversion model 210 for conditioning at every time step.

In some implementations, the personalization embedding 251 generated for each respective speaker embedding 350 extracted during the training process 200 corresponds to a context vector that parameterizes the speech conversion model 210 as an additional side input leading to an implicit classifier of the respective training speaker while concurrently training the speech conversion model 210 on the training utterances 305 spoken by the training speaker. Accordingly, the speech conversion model 210 may receive the personalization embedding 251 (or the speaker embedding 350) for a respective training speaker as input when training the speech conversion model 210 on the set of training utterances 305 spoken by the training speaker. For instance, the personalization embedding 251 may indicate that the training speaker is grouped into the style cluster 260 associated with heavy French accented-speech to thereby allow the speech conversion model 210 to adapt to improving performance on recognizing/converting the training utterances 305 conveying the heavy French accent.

In additional implementations, the personalization embedding 251 (or the speaker embedding 350) is instead provided as a side input to the sub-model 280 for training the sub-model 280 on the training utterances 305 spoken by the training speaker. In these implementations, the speech conversion model 210 includes a base model associated with an off-the-shelf pre-trained speech conversion model 210. For instance, the pre-trained speech conversion model 210 may include a state of the art model trained on a general corpus of training utterances spoken by a variety of different speakers with typical speech patterns and the sub-model 280 may be trained on the training utterances 305 to learn how to bias the pre-trained speech conversion model 210 to improve performance on recognizing/converting the training utterances 305 associated with atypical speech. Training the sub-model 280 as a modular extension for biasing the pre-trained base speech conversion model 210 advantageously helps during inference when a reference speech sample is not obtained from the target speaker by allowing the pre-trained base speech conversion model 210 process the input utterance regardless of the speaker characteristics. For instance, a target speaker speaking an initial input utterance for conversion/recognition by the speech conversion system 100 may not be of sufficient duration for the speech embedding network 250 to extract a speaker embedding and/or personalization embedding 251 therefrom. However, once audio data conveying input utterances of sufficient duration are available for the speaker embedding network 250 to extract the speaker embedding 350 and/or personalization embedding 251 therefrom, the speaker embedding network 250 may provide the speaker embedding 350 and/or the personalization embedding 251 as the side input to the sub-model 280 for biasing the speech conversion model 210.

In some examples, the sub-model 210 is disposed in a neural network layer of the audio encoder 212 or disposed between two neural network layers of the audio encoder 212. In other examples, the sub-model 210 is disposed in a neural network layer of the decoder 220, 225 or between two neural network layers of the decoder 220, 225. In some additional examples, a first sub-model 210 is disposed in the audio encoder 212 and a second sub-model 210 is disposed in the decoder 220, 225 of the pre-trained speech conversion model 210. During the training process 200, the parameters of the pre-trained speech conversion model 310 may be frozen while training the speech embedding network 250 and the sub-model(s) 280 on the training utterances 305.

In some implementations, a single sub-model 280 is trained to bias/influence the speech conversion model 210 across a diverse set of different types of atypical speech. During inference, the reference encoder 300 may receive, as input, the reference audio signal 312 corresponding to reference speech spoken by a given target speaker 104 associated with atypical speech, and generate, as output, a speaker embedding 350 for the target speaker 104 that conveys the speaker characteristics (e.g., a type of atypical speech) associated with the target speaker 104. Using the techniques described above, the style attention mechanism 254 may attend the speaker embedding 350 to determine a personalization embedding 251 for the target speaker 104. The personalization embedding 251 may serve as a one-hot vector that adapts the speech conversion model 210 for a particular one of the types of atypical speech. In additional implementations, a plurality of sub-models 280 are each trained for biasing/influencing the speech conversion model 210 for a respective type of atypical speech. That is, a separate sub-model 280 may be trained for each type of atypical speech identified by the speaker embedding network 250 from the multiple sets of training utterances 305 during the training process 200. As such, each style cluster 260 of speaker embeddings 350 extracted during the training process 200 may map to a respective personalization embedding 251 that represents a respective type of atypical speech (and optionally a severity level of the type of atypical speech). Accordingly, a personalization embedding 251 output by the speaker embedding network 250 during inference may serve as a one-hot vector for selecting the appropriate sub-model 280 (i.e., the sub-model corresponding to the type of atypical speech associated with the source speaker 104) from a plurality of different sub-models.

Figure 4:
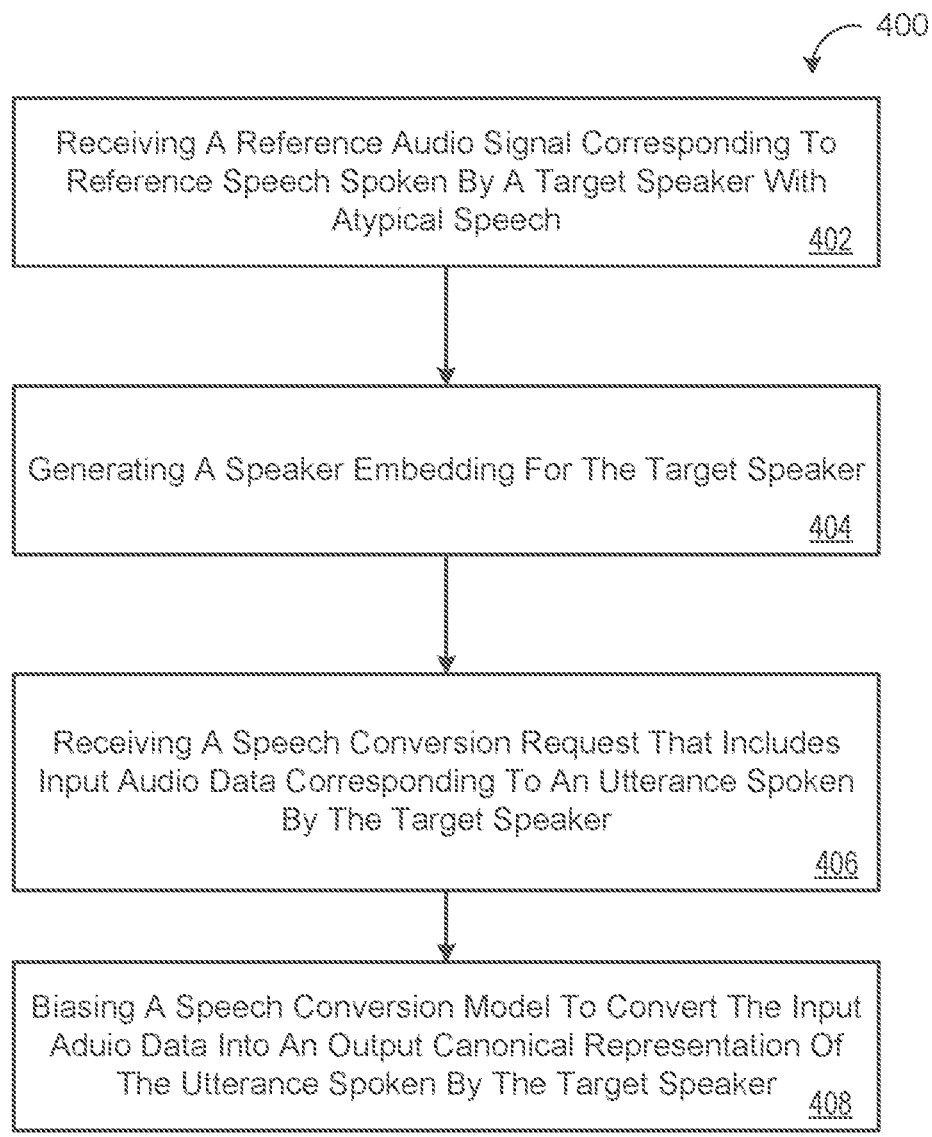
FIG. 4 is a flowchart of an example arrangement of operations for a method of using a speaker embedding for personalizing a speech conversion model toward a target speaker having atypical speech.

FIG. 4 provides flowchart of an example arrangement of operations for a method 400 of using a speaker embedding 350 for personalizing a speech conversion model 210 toward a target speaker 104 having atypical speech. Data processing hardware 510 (FIG. 5) may perform the operations for the method 400 by executing instructions stored on memory hardware 520 (FIG. 5) in communication with the data processing hardware 510. The data processing hardware 510 and the memory hardware 520 may reside on a computing device 500 (FIG. 5), such as a remote server 112 and/or the user computing device 110 of FIGS. 1A and 1B. At operation 402, the method 400 includes receiving a reference audio signal 312 corresponding to reference speech spoken by the target speaker 104 with atypical speech.

At operation 404, the method 400 includes generating, by a speaker embedding network 250 configured to receive the reference audio signal 312 as input, a speaker embedding 350 for the target speaker 104. Here, the speaker embedding 350 conveys speaker characteristics of the target speaker 104. The speaker characteristics may convey an accent (e.g., French accent) and a speech pattern associated with the target speaker 104. For instance, the speech pattern conveyed by the speaker embedding 350 may include a typical speech pattern or one of a variety of different types of atypical speech patterns (e.g., heavy accents spanning different dialects, irregular speech spanning different neurological conditions).

At operation 406, the method 400 includes receiving a speech conversion request that includes input audio data 102 corresponding to an utterance spoken 108 by the target speaker 104 associated with the atypical speech. At operation 408, the method 400 includes biasing, using the speaker embedding 350 generated for the target speaker 104 by the speaker embedding network 250, the speech conversion model 210 to convert the input audio data 102 corresponding to the utterance 108 spoken by the target speaker 104 associated with atypical speech into an output canonical representation 106, 120 of the utterance spoken by the target speaker.

In some examples, the speech conversion model 210 includes a speech-to-speech conversion model 210 configured to convert input spectrograms or audio waveforms directly into output spectrograms or audio waveforms. In these examples, the output canonical representation includes output audio data corresponding to a synthesized canonical fluent speech representation of the utterance spoken by the target speaker.

In other examples, the speech conversion model 210 includes an automated speech recognition model 210b configured to convert speech into text. In these examples, the output canonical representation includes a canonical textual representation of the utterance 108 spoken by the target speaker 104.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
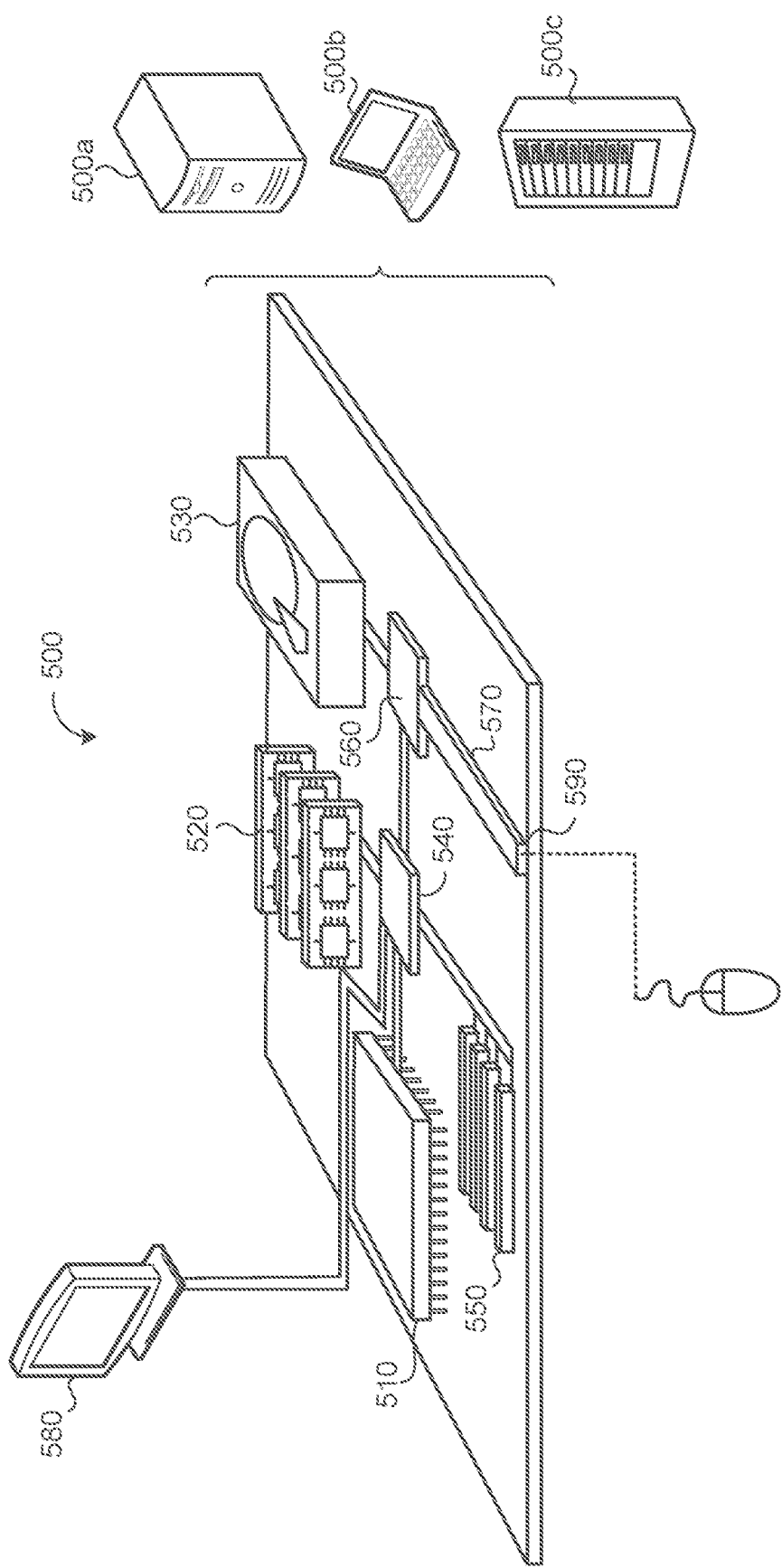
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
   receiving a reference audio signal corresponding to reference speech spoken by a target speaker with atypical speech;
   generating, by a speaker embedding network configured to receive the reference audio signal as input, a speaker embedding for the target speaker, the speaker embedding conveying speaker characteristics of the target speaker;
   determining, using the speaker embedding network, a personalization embedding for the target speaker based on the speaker embedding, the personalization embedding corresponding to a respective style cluster of speaker embeddings extracted from training utterances spoken by speakers that convey speaker characteristics similar to the speaker characteristics conveyed by the speaker embedding;
   receiving a speech conversion request comprising input audio data corresponding to an utterance spoken by the target speaker associated with the atypical speech; and
   biasing, using the speaker embedding generated for the target speaker by the speaker embedding network, a speech conversion model to convert the input audio data corresponding to the utterance spoken by the target speaker associated with atypical speech into an output canonical representation of the utterance spoken by the target speaker,
wherein biasing the speech conversion model comprises using the personalized embedding determined for the target speaker to bias the speech conversion model for a type of the atypical speech associated with the target speaker.

2. The computer-implemented method of claim 1, wherein:
the speech conversion model comprises a speech-to-speech conversion model configured to convert input spectrograms or audio waveforms directly into output spectrograms or audio waveforms; and
biasing the speech conversion model comprises biasing, using the speaker embedding, the speech-to-speech conversion model to convert the input audio data corresponding to the utterance spoken by the target speaker associated with atypical speech into output audio data corresponding to a synthesized canonical fluent speech representation of the utterance spoken by the target speaker, wherein the output canonical representation comprises the synthesized canonical fluent speech representation.

3. The computer-implemented method of claim 1, wherein:
the speech conversion model comprises an automated speech recognition model configured to convert speech into text; and
biasing the speech conversion model comprises biasing, using the speaker embedding, the automated speech recognition model to convert the input audio data corresponding to the utterance spoken by the target speaker associated with atypical speech into a canonical textual representation of the utterance spoken by the target speaker, wherein the output canonical representation comprises the canonical textual representation.

4. The computer-implemented method of claim 1, wherein using the personalization embedding determined for the target speaker to bias the speech conversion model comprises providing the personalization embedding as a side input to the speech conversion model for biasing the speech conversion model for the type of the atypical speech associated with the target speaker.

5. The computer-implemented method of claim 1, wherein using the personalization embedding determined for the target speaker to bias the speech conversion model comprises providing the personalization embedding as a side input to a sub-model that biases the speech conversion model for the type of the atypical speech associated with the target speaker.

6. The computer-implemented method of claim 5, wherein the operations further comprise, prior to biasing the speech conversion model, selecting, using the personalization embedding determined for the target speaker, the sub-model from a plurality of different sub-models, each sub-model of the plurality of different sub-models trained for a different type or severity of atypical speech.

7. The computer-implemented method of claim 1, wherein a training process trains the speech conversion model end-to-end concurrently with the speaker embedding network by:
obtaining multiple sets of spoken training utterances, each set of the spoken training utterances spoken by a different respective training speaker and comprising:
audio data characterizing the training utterances that include atypical speech patterns for a type of atypical speech associated with the respective training speaker; and
a canonical transcription of the training utterances spoken by the respective training speaker; and
training the speech conversion model and the speaker embedding model concurrently on the multiple sets of spoken training utterances.

8. The computer-implemented method of claim 7, wherein:
the speaker embedding network comprises a reference encoder and a style attention module, the reference encoder configured to extract, from each set of the spoken training utterances, a respective speaker embedding for the respective training speaker; and
training the speech conversion model and the speaker embedding network comprises:
training the style attention module to learn how to group the speaker embeddings into style clusters, each style cluster denoting a respective cluster of speaker embeddings extracted from the training utterances spoken by training speakers with similar speaker characteristics, and each style cluster mapping to a respective personalization embedding that represents a respective type of atypical speech; and
for each corresponding set of the multiple sets of spoken training utterances, biasing the speech conversion model for the corresponding set of the spoken training utterances using the respective personalization embedding that maps to the style cluster that includes the respective speaker embedding extracted from the corresponding set of the spoken training utterances.

9. The computer-implemented method of claim 7, wherein:
training the speech conversion model and the speaker embedding model concurrently further includes training a sub-model on the multiple sets of the training utterances to learn how to bias the speech conversion model; and
parameters of the speech conversion model are frozen while training the speech embedding network and the sub-model on the multiple sets of the training utterances.

10. The computer-implemented method of claim 7, wherein one or more sets among the multiple sets of training utterances each include atypical speech patterns for a respective type of atypical speech associated with the different respective training speaker that is different than the respective types of atypical speech associated with each other different respective training speaker.

11. A system comprising:
data processing hardware; and
memory hardware in communication with the data processing hardware, the memory hardware storing instructions that when executed on the data processing hardware cause the data processing hardware to perform operations comprising:
receiving a reference audio signal corresponding to reference speech spoken by a target speaker with atypical speech;
generating, by a speaker embedding network configured to receive the reference audio signal as input, a speaker embedding for the target speaker, the speaker embedding conveying speaker characteristics of the target speaker;

determining, using the speaker embedding network, a personalization embedding for the target speaker based on the speaker embedding, the personalization embedding corresponding to a respective style cluster of speaker embeddings extracted from training utterances spoken by speakers that convey speaker characteristics similar to the speaker characteristics conveyed by the speaker embedding;

receiving a speech conversion request comprising input audio data corresponding to an utterance spoken by the target speaker associated with the atypical speech; and biasing, using the speaker embedding generated for the target speaker by the speaker embedding network, a speech conversion model to convert the input audio data corresponding to the utterance spoken by the target speaker associated with atypical speech into an output canonical representation of the utterance spoken by the target speaker, wherein biasing the speech conversion model comprises using the personalized embedding determined for the target speaker to bias the speech conversion model for a type of the atypical speech associated with the target speaker.

12. The system of claim 11, wherein:

the speech conversion model comprises a speech-to-speech conversion model configured to convert input spectrograms or audio waveforms directly into output spectrograms or audio waveforms; and biasing the speech conversion model comprises biasing, using the speaker embedding, the speech-to-speech conversion model to convert the input audio data corresponding to the utterance spoken by the target speaker associated with atypical speech into output audio data corresponding to a synthesized canonical fluent speech representation of the utterance spoken by the target speaker, wherein the output canonical representation comprises the synthesized canonical fluent speech representation.

13. The system of claim 11, wherein:

the speech conversion model comprises an automated speech recognition model configured to convert speech into text; and biasing the speech conversion model comprises biasing, using the speaker embedding, the automated speech recognition model to convert the input audio data corresponding to the utterance spoken by the target speaker associated with atypical speech into a canonical textual representation of the utterance spoken by the target speaker, wherein the output canonical representation comprises the canonical textual representation.

14. The system of claim 11, wherein using the personalization embedding determined for the target speaker to bias the speech conversion model comprises providing the personalization embedding as a side input to the speech conversion model for biasing the speech conversion model for the type of the atypical speech associated with the target speaker.

15. The system of claim 11, wherein using the personalization embedding determined for the target speaker to bias the speech conversion model comprises providing the personalization embedding as a side input to a sub-model that biases the speech conversion model for the type of the atypical speech associated with the target speaker.

16. The system of claim 15, wherein the operations further comprise, prior to biasing the speech conversion model, selecting, using the personalization embedding determined for the target speaker, the sub-model from a plurality of different sub-models, each sub-model of the plurality of different sub-models trained for a different type or severity of atypical speech.

17. The system of claim 11, wherein a training process trains the speech conversion model end-to-end concurrently with the speaker embedding network by:

obtaining multiple sets of spoken training utterances, each set of the spoken training utterances spoken by a different respective training speaker and comprising:
audio data characterizing the training utterances that include atypical speech patterns for a type of atypical speech associated with the respective training speaker; and
a canonical transcription of the training utterances spoken by the respective training speaker; and training the speech conversion model and the speaker embedding model concurrently on the multiple sets of spoken training utterances.

18. The system of claim 17, wherein:

the speaker embedding network comprises a reference encoder and a style attention module, the reference encoder configured to extract, from each set of the spoken training utterances, a respective speaker embedding for the respective training speaker; and training the speech conversion model and the speaker embedding network comprises:
training the style attention module to learn how to group the speaker embeddings into style clusters, each style cluster denoting a respective cluster of speaker embeddings extracted from the training utterances spoken by training speakers with similar speaker characteristics, and each style cluster mapping to a respective personalization embedding that represents a respective type of atypical speech; and
for each corresponding set of the multiple sets of spoken training utterances, biasing the speech conversion model for the corresponding set of the spoken training utterances using the respective personalization embedding that maps to the style cluster that includes the respective speaker embedding extracted from the corresponding set of the spoken training utterances.

19. The system of claim 17, wherein:

training the speech conversion model and the speaker embedding model concurrently further includes training a sub-model on the multiple sets of the training utterances to learn how to bias the speech conversion model; and parameters of the speech conversion model are frozen while training the speech embedding network and the sub-model on the multiple sets of the training utterances.

20. The system of claim 17, wherein one or more sets among the multiple sets of training utterances each include atypical speech patterns for a respective type of atypical speech associated with the different respective training speaker that is different than the respective types of atypical speech associated with each other different respective training speaker.

* * * * *